US010809873B2

(12) United States Patent
Beszteri et al.

(10) Patent No.: US 10,809,873 B2
(45) Date of Patent: Oct. 20, 2020

(54) CONTROLLING CONTENT DISPLAYED IN A DISPLAY

(71) Applicant: Nokia Technologies Oy, Espoo (FI)

(72) Inventors: Istvan Beszteri, Espoo (FI); Mika Kasslin, Espoo (FI); Janne Marin, Espoo (FI); Lauri Laitinen, Espoo (FI); Olli Alanen, Vantaa (FI); Oleg Chistyakov, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/343,980

(22) PCT Filed: Oct. 20, 2017

(86) PCT No.: PCT/FI2017/050730
§ 371 (c)(1),
(2) Date: Apr. 22, 2019

(87) PCT Pub. No.: WO2018/078214
PCT Pub. Date: May 3, 2018

(65) Prior Publication Data
US 2019/0332244 A1    Oct. 31, 2019

(30) Foreign Application Priority Data

Oct. 31, 2016    (EP) ..................... 16196640

(51) Int. Cl.
*G06F 3/00*    (2006.01)
*G06F 3/0481*    (2013.01)
*G06F 3/01*    (2006.01)
*G06F 3/14*    (2006.01)

(52) U.S. Cl.
CPC .......... *G06F 3/04815* (2013.01); *G06F 3/013* (2013.01); *G06F 3/14* (2013.01); *G09G 2320/0261* (2013.01); *G09G 2340/0464* (2013.01); *G09G 2354/00* (2013.01)

(58) Field of Classification Search
None
See application file for complete search history.

(56) References Cited

U.S. PATENT DOCUMENTS

| 656,027 | A | 8/1900 | Kuebler |
| 5,596,379 | A | 1/1997 | Kawesch |
| 5,668,743 | A | 9/1997 | Kushelvesky |

(Continued)

FOREIGN PATENT DOCUMENTS

| CN | 105354334 A | 2/2016 |
| EP | 3037916 A1 | 6/2016 |

(Continued)

OTHER PUBLICATIONS

"Get Ready to See More Than Yourself in the Mirror", Slice of Lime, Retrieved on Apr. 2, 2019, Webpage available at : http://www.sliceoflime.com/see-more-than-yourself-in-mirror/.

(Continued)

*Primary Examiner* — Martin Mushambo
(74) *Attorney, Agent, or Firm* — Harrington & Smith (57) ABSTRACT

A method comprising: determining, relative to a display, a point of view of a user of the display; controlling content displayed in the display in dependence upon the determination of the point of view of the user of the display.

19 Claims, 3 Drawing Sheets

(56) References Cited

U.S. PATENT DOCUMENTS

| | | |
|---|---|---|
| 6,434,255 B1 | 8/2002 | Harakawa |
| 7,893,920 B2 | 2/2011 | Endoh |
| 8,337,306 B2 | 12/2012 | Larsen et al. |
| 8,624,883 B2 | 1/2014 | Vilcovsky |
| 8,894,209 B2 | 11/2014 | Berry et al. |
| 8,976,160 B2 | 3/2015 | Vilcovsky |
| 9,014,546 B2 | 4/2015 | Shimy et al. |
| 9,060,093 B2 | 6/2015 | Chu |
| 9,317,175 B1 | 4/2016 | Lockhart |
| 9,387,824 B2 | 7/2016 | Pisz et al. |
| 9,773,349 B2* | 9/2017 | Mullins .............. G02B 27/0101 |
| 10,379,612 B1* | 8/2019 | Bonnier .................. G06F 3/013 |
| 2003/0132913 A1 | 7/2003 | Issinski |
| 2008/0049020 A1 | 2/2008 | Gusler et al. |
| 2008/0189173 A1 | 8/2008 | Bakar et al. |
| 2008/0266094 A1 | 10/2008 | Hanebeck |
| 2008/0270579 A1 | 10/2008 | Herz et al. |
| 2010/0013739 A1* | 1/2010 | Sako .................... G02B 27/017 345/8 |
| 2010/0085462 A1* | 4/2010 | Sako .................... G06T 11/001 348/333.01 |
| 2010/0153891 A1 | 6/2010 | Vaananen et al. |
| 2010/0188426 A1 | 7/2010 | Ohmori et al. |
| 2010/0253319 A1 | 10/2010 | Cehelnik |
| 2011/0216060 A1* | 9/2011 | Weising .................. G09G 5/08 345/419 |
| 2012/0256967 A1* | 10/2012 | Baldwin ................ G06F 3/013 345/684 |
| 2013/0145272 A1 | 6/2013 | Boggie et al. |
| 2013/0301007 A1 | 11/2013 | Wolffsohn et al. |
| 2014/0022157 A1* | 1/2014 | Lee ........................ G06F 3/013 345/156 |
| 2014/0085178 A1 | 3/2014 | Kokkosoulis et al. |
| 2014/0104168 A1 | 4/2014 | Hegde |
| 2014/0184494 A1 | 7/2014 | Burachas |
| 2014/0191965 A1 | 7/2014 | Rigley |
| 2014/0198033 A1* | 7/2014 | Kobayashi ........... G02B 27/017 345/156 |
| 2014/0223326 A1 | 8/2014 | Mantripragada et al. |
| 2015/0009130 A1 | 1/2015 | Motta et al. |
| 2015/0179149 A1 | 6/2015 | Park |
| 2015/0220931 A1 | 8/2015 | Alsina et al. |
| 2016/0055758 A1 | 2/2016 | Francis |
| 2016/0070105 A1* | 3/2016 | Tannoudiji ......... G02B 27/0172 345/8 |
| 2016/0077584 A1* | 3/2016 | Xiang .................... G06F 3/013 345/156 |

FOREIGN PATENT DOCUMENTS

| | | |
|---|---|---|
| EP | 3115870 A1 | 1/2017 |
| WO | 2005/071656 A1 | 8/2005 |
| WO | 2013/154295 A1 | 10/2013 |
| WO | 2013/190538 A1 | 12/2013 |
| WO | 2015/028721 A1 | 3/2015 |
| WO | 2015/199827 A1 | 12/2015 |
| WO | 2016/011713 A1 | 1/2016 |
| WO | 2016/040089 A1 | 3/2016 |

OTHER PUBLICATIONS

Banerjee et al., "Mouse Control Using a Web Camera Based on Colour Detection", International Journal of Computer Trends and Technology (IJCTT), vol. 9, No. 1, Mar. 2014, pp. 15-20.
Park, "A Method for Controlling Mouse Movement Using a Real-time Camera", Thesis, Jan. 2008, pp. 1-11.
"Behind Microsoft's magic mirror: Raspberry Pi, AI, Windows IoT plus Azure", ZDNet, Retrieved on Apr. 15, 2019, Webpage available at : https://www.zdnet.com/article/behind-microsofts-magic-mirror-raspberry-pi-ai-windows-iot-plus-azure/.
Yuan, "Using Large-size 2D Displays to Create 3D Hyper-Realistic See-Through Experiences", The Processing of 16th International Display Workshops, Jan. 2009, 4 pages.
"Technology Behind Smart Bathroom Mirrors", Boston Commons High Tech Network, Retrieved on Jul. 22, 2016, Webpage available at : http://www.bostoncommons.net/technology-behind-smart-bathroom-mirrors/.
Rolkosky et al., "Calibration Tools for PC-Based Vision Assessment", Annual International Conference of the IEEE Engineering in Medicine and Biology Society, 2009, pp. 1-17.
Extended European Search Report received for corresponding European Patent Application No. 16196642.9, dated Dec. 13, 2016, 9 pages.
Partial European Search Report received for corresponding European Patent Application No. 16196640.3, dated Apr. 21, 2017, 11 pages.
Extended European Search Report received for corresponding European Patent Application No. 16196640.3, dated Jul. 26, 2017, 11 pages.
International Search Report and Written Opinion received for corresponding Patent Cooperation Treaty Application No. PCT/FI2017/050740, dated Dec. 19, 2017, 13 pages.
International Search Report and Written Opinion received for corresponding Patent Cooperation Treaty Application No. PCT/FI2017/050730, dated Mar. 19, 2018, 16 pages.
Office action received for corresponding European Patent Application No. 16196642.9, dated Nov. 21, 2018, 5 pages.

* cited by examiner

CONTROLLING CONTENT DISPLAYED IN A DISPLAY

RELATED APPLICATION

This application was originally filed as PCT Application No. PCT/FI2017/050730 filed Oct. 20, 2017 which claims priority benefit from EP Patent Application No. 16196640.3, filed Oct. 31, 2016.

TECHNOLOGICAL FIELD

Embodiments of the present invention relate to controlling content displayed on a display.

BACKGROUND

It may be desirable to control if and how content is displayed on a display to provide a particular user experience to a user viewing the display.

BRIEF SUMMARY

According to various, but not necessarily all, embodiments of the invention there is provided a method comprising: determining, relative to a display, a point of view of a user of the display; and controlling content displayed in the display in dependence upon the determination of the point of view of the user of the display.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which.

DETAILED DESCRIPTION

Figure 1:
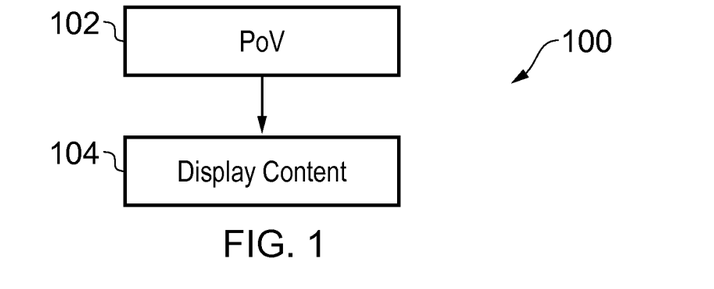
FIG. 1 illustrates an example of a method for controlling content displayed in a display in dependence upon determination of the point of view of the user.

FIG. 1 illustrates an example of a method 100 for controlling content displayed in a display. The method comprises at block 102, determining, relative to the display, a point of view of a user. The method then comprises at block 104, controlling content displayed in the display in dependence upon the determination of the point of view of the user relative to the display.

In some examples, the method 100 may be performed repeatedly such that there is dynamic control of content displayed in the display that is immediately responsive to a change in a user's point of view relative to the display. In this way, it may be possible to achieve real time variation of the displayed content as a user moves relative to the display.

Figure 2:
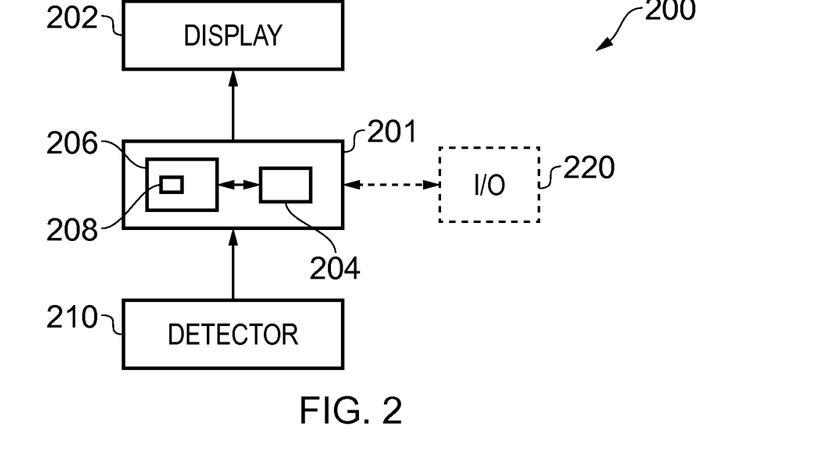
FIG. 2 illustrates an example of an apparatus.

FIG. 2 illustrates an example of an apparatus 200 which may be used to perform the method 100. In this example, the apparatus 200 comprises a controller 201 which is configured to use one or more detectors 210 to determine a point of view of a user relative to the display 202. The controller 201 is configured to control content displayed in the display 202 in dependence upon the determination of the point of view of the user 300 relative to the display 202.

Figure 3:
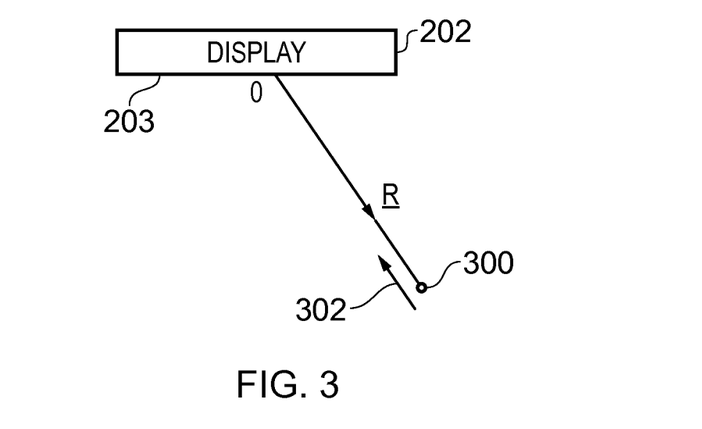
FIG. 3 illustrates an example of a display.

FIG. 3 illustrates an example of a display 202 that has a display surface 203. A user 300 uses the display from a particular position. The particular position is defined, in this example, using a vector R which defines the displacement of the user relative to a defined origin O. In this example, the origin is at the centre of the display, however, the origin may be located at a different position. In this example, as the vector R is a displacement relative to the display, it also represents a point of view 302 of the user 300 relative to the display 202. The point of view represents the direction in which the user 300 looks at the display 202.

Although in this example, the display is illustrated as a display that comprises a surface 203, in other examples the display may be an alternative display. The display 32 may be a visual display that provides light that displays to a user. Examples of visual displays include liquid crystal displays, organic light emitting displays, emissive, reflective, transmissive and transflective displays, direct retina projection display, near eye displays etc.

Referring to the example of FIG. 2, the controller 201, is configured to control a position at which content is displayed in the display 202 in dependence upon the determination of the point of view 302 of the user 300.

The point of view 302 may be determined by positioning the user 300 relative to the display 202. The one or more detectors 210 may be used to position the user 300 relative to the apparatus 200 and consequently, relative to the display 202.

In some but not necessarily all examples, the apparatus 200 comprises as part of the detector circuitry 210 point of view sensors 45 for determining changes in the real point of view.

For example, positioning technology such as GPS, triangulation (trilateration) by transmitting to multiple receivers and/or receiving from multiple transmitters, acceleration detection and integration may be used to determine a new physical location of the user 300 and real point of view 302.

For example, accelerometers, electronic gyroscopes or electronic compasses may be used to determine a change in an orientation of a user's head or view point and a consequential change in the real direction of the real point of view 302.

For example, pupil tracking technology, based for example on computer vision, may be used to track movement of a user's eye or eyes and therefore determine a direction of a user's gaze and consequential changes in the real direction of the real point of view 302.

The apparatus 200 may comprise as part of the detector circuitry 210 image sensors for imaging the real space. An example of an image sensor is a digital image sensor that is configured to operate as a camera. Such a camera may be operated to record static images and/or video images In some, but not necessarily all embodiments, cameras may be configured in a stereoscopic or other spatially distributed arrangement so that the real space is viewed from different perspectives. This may enable the creation of a three-dimensional image and/or processing to establish depth, for example, via the parallax effect.

In some, but not necessarily all embodiments, the detector circuitry 210 may comprise depth sensors. A depth sensor may comprise a transmitter and a receiver. The transmitter transmits a signal (for example, a signal a human cannot sense such as ultrasound or infrared light) and the receiver receives the reflected signal. Using a single transmitter and a single receiver some depth information may be achieved via measuring the time of flight from transmission to reception. Better resolution may be achieved by using more transmitters and/or more receivers (spatial diversity). In one example, the transmitter is configured to 'paint' the real space with light, preferably invisible light such as infrared light, with a spatially dependent pattern. Detection of a certain pattern by the receiver allows the real space to be spatially resolved. The distance to the spatially resolved portion of the real space may be determined by time of flight and/or stereoscopy (if the receiver is in a stereoscopic position relative to the transmitter).

Where a camera or other image sensor is used, it may be adapted to maintain the privacy of a user. For example, it may only captured a de-focused or blurred image or may comprise an algorithm to blur a human face on capture.

The FIGS. 4 to 8B illustrate various examples in which the point of view 302 of the user 300 is used to determine from where on the display 202, light 320 from a scene feature 310 leaves the display 202 and reaches the user 300. The method 100 then controls the content displayed in this area of the display.

In the examples of FIGS. 4 to 6B, the scene feature 310 is a displayed feature of a displayed scene. The scene feature 310 is therefore generated as content on the display 202. The scene feature 310 is a feature of a virtual space 330 that is behind the display 202 viewed by the user. The virtual space 330 may be a generated space (virtual reality or see video mediated reality) or a real space (augmented reality or see-through mediated reality).

Figure 4:
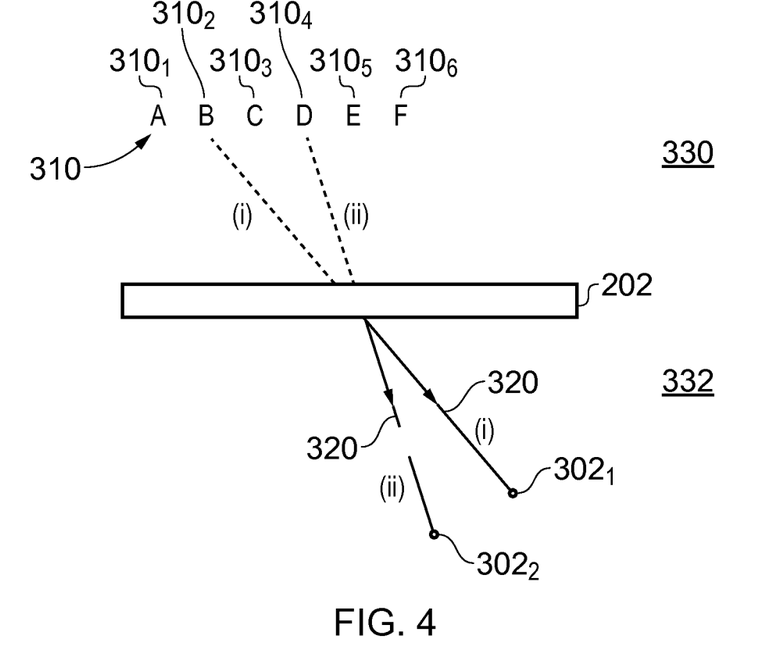
FIGS. 4, 5A, 5B, 6A, 6B illustrate examples in which content is displayed in a display in dependence upon determination of the point of view of the user and the consequent virtual scene features that should be seen by the user.

In the example of FIG. 4, the light 320 produced by the display 202 at a time $t_1$ is received by the user 300 when the user has a point of view $302_1$. This light appears to originate from the scene feature $310_2$ (B) in the virtual space 330. As a consequence the scene feature $310_2$ (B) appears in the centre of the display 202 (see FIGS. 5A and 6A). Other scene features $310_1$(A), $310_3$(C), $310_4$(D), $310_5$ (E), $310_6$(F) may also be displayed on the display 202 to reproduce a virtual scene comprising the scene features 310 in the virtual space 330. This is achieved by different portions of the display 202 generating different ones of the scene features 310. For example, in FIG. 5A the scene feature B is displayed at the centre of the display, the scene feature A is displayed to its immediate left (from the user's perspective), the scene feature C is displayed to its immediate right and the scene feature D is displayed to the right of the scene feature C.

Referring back to FIG. 4, at a later time $t_2$, the user 300 has a point of view $302_2$ and the light 320 produced by the display 202 at a time $t_2$ is received by the user 300. The light 320 from the central portion of the display 202 appears to originate from the scene feature $310_4$ (D) in the virtual space 330. The scene feature $310_4$(D) is therefore generated at the centre of the display 202 (see FIGS. 5B and 6B). As previously described other portions of the display 202 display other scene features creating the virtual scene of the virtual space 330. In the example of FIG. 5B, the scene feature D is displayed in the centre of the display, the scene feature C is displayed immediately to its left and the scene feature B is displayed immediately to the left of the scene feature C. The scene feature E is displayed immediately to the right of the scene feature D and the scene feature F is displayed immediately to the right of the scene feature E.

Figure 5A:
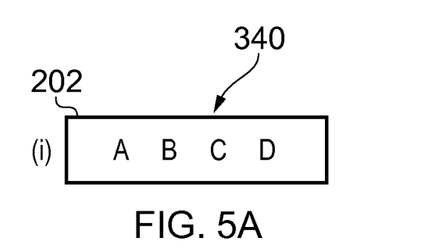
Figure 5B:
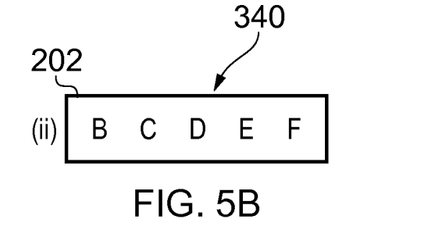

It is therefore apparent when considering FIGS. 5A and 5B, in the context of FIG. 4, that as the point of view 302 of the user 300 changes the content 340 displayed by the display 202 also changes. In this example the user moves relative to the display 202 from right to left. This causes the content 340 displayed by the display 202 to scroll from right to left. For example the content 340 that is central to the display 202 in FIG. 5A (scene feature B) is positioned to the left of the display 202 in FIG. 5B.

Figure 6A:
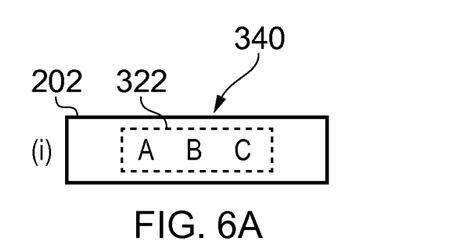
Figure 6B:
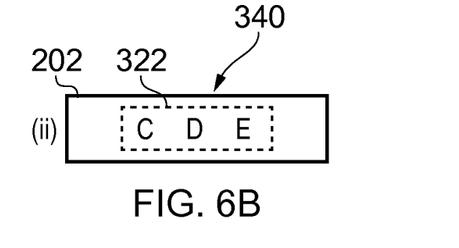

In the examples of FIGS. 5A and 5B, the whole of the display 202 has been used to display the content 340. In the examples of FIGS. 6A and 6B, only a portion of the display is used to display the content 340. This portion of the display is designated in this example as a fixed virtual window 332. This is a display area of fixed size and location. The content 340 is displayed only within this virtual display window 332. In this example, when the point of view 302 of the user 300 changes from the point of view $302_1$ to the point of view $302_2$ this change is illustrated by FIG. 6A (which indicates the displayed content at the point of view $302_1$) and FIG. 6B (which demonstrates or illustrates the content displayed to the user when at the point of view $302_2$).

As the user moves from the point of view $302_1$ to the point of view $302_2$, the content 340 scrolls through the virtual fixed window 332. This is achieved by controlling whether or not content is displayed on the display 202 and where it is displayed in dependence upon the determination of the user's point of view. For example, comparing FIG. 6A with FIG. 6B, the scene feature D is not displayed in FIG. 6A and comparing FIG. 6B with FIG. 5B, the scene features B, F are not displayed in FIG. 6B.

Figure 7:
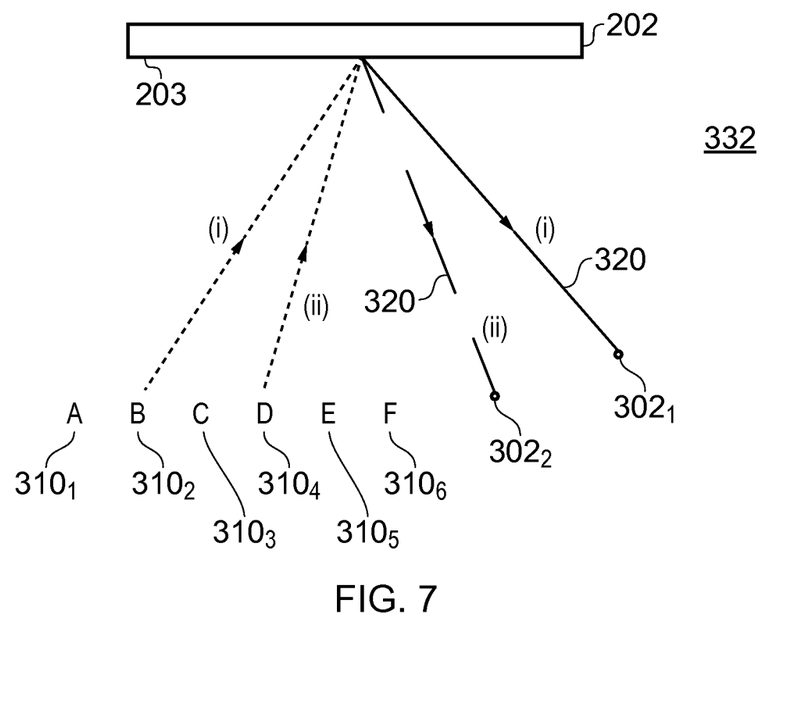
FIGS. 7, 8A, 8B illustrate examples in which content is displayed in a display in dependence upon determination of the point of view of the user and the consequent real scene features that are seen in reflection off the display by the user.
Figure 8A:
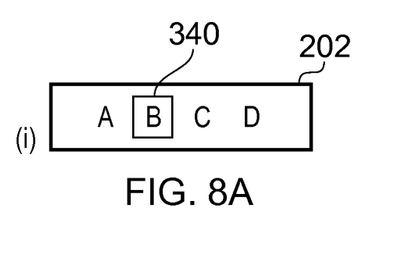
Figure 8B:
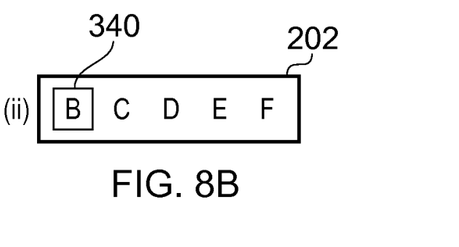

FIGS. 7 to 8B illustrate an example in which the scene feature 310 is a real feature in a real space 332. The scene feature 310 is a feature that is detected, not displayed for example by detector 210. Each scene feature 310 is a feature of the real space 332 that is occupied by the user 300 and viewed in reflection from a reflective surface 203 of the display 202.

In some, but not necessarily all examples, the reflective surface 203 of the display 202 is provided by a one-way mirrored front surface of the display 202.

In this example, the method 100 uses the user's point of view 302 to determine an area of the display where light 320 from a particular scene feature 310 reflects to the user 300.

For example, when the user 300 is at the point of view $302_1$ at a time $t_1$, the light 320 from the scene feature $310_2$ (B) reflects off the centre of the display 202 towards the user 300 as illustrated in FIG. 7. As a consequence, the scene feature $310_2$ (B) is seen as a reflected image at the centre of the reflective surface 203 of the display 200 as illustrated in FIG. 8A. When the user 300 changes position to have a point of view $302_2$ at a time $t_2$, the light 320 from the scene feature $310_4$ (D) reflects off the centre of the display 202 and reaches the user 300. As a consequence, the scene feature D is a reflected image at the centre of the reflective surface 203 of the display 202, as illustrated in FIG. 8B. Therefore, as the user 300 changes position the real scene features 310 change their position in the reflective surface 203 of the display 202. The content 340 displayed by the display 202 is adapted to take account of this change in position of the reflected real scene features 310 in the reflective surface 203 of the display.

For example, in the examples of FIGS. 8A and 8B, the scene feature B is highlighted. In some examples, the display 202 may be controlled so that content 340 displayed by the display 202 is displayed to avoid the scene feature $310_2$ (B) and in some other examples the content 340 displayed by the display 202 may be displayed so that it is aligned with and overlaps the scene feature $310_2$(B).

As an example, a scene feature 310 may be selected by the controller 201 as a scene feature that should be avoided as a background for displaying text or other content. This scene feature 310 may be selected based upon a visual characteristic of the scene feature 310, for example, because it has a high brightness. As the scene feature 310 has a high brightness, if text is displayed on a region of the display 202 where this scene feature is reflected, the text will be difficult to see. The method 100 therefore avoids using the region of the display 202 where the high brightness scene feature 310 is reflected as a background for displaying text.

In another example, the controller 201 may select a scene feature 310 for use as a background for display of text or some other content. The scene feature 310, for use as background, may for example be selected because it has a consistent appearance. For example, some measure of the entropy of the reflected scene features from a visual perspective may be determined and the scene feature with the lowest entropy may be selected. The entropy may, for example, be determined as a measure of the variation of color and/or brightness over a defined area.

In these examples, when the controller 201 controls displayed text, displayed in the display 202, in dependence upon the determination of the user's point of view 302, the control of the displayed text may for example comprise controlling (varying) one or more of font size, style, color, brightness, contrast.

In some examples, an algorithm may be used to determine which of the text characteristics (for example font size, style, color, brightness, contrast, position) render the displayed text most visible in the context of the current reflections from the display that the user sees. For example, the displayed text may be optimized to improve visibility of the displayed text relative to a background determined by reflected scene features 310 from the point of view 302 of the user 300.

In one example, a method 100 may control one or more of the size, position, color, brightness of displayed text to control a difference measure between the displayed text and the background to the text determined by the reflected scene features 310 from the point of view 302 of the user 300.

In this context, it may for example be desirable to make sure that every portion of the displayed text is distinct relative to the reflected background. This may be achieved by assessing the visual characteristics of the scene features 310 that represent the reflected background and comparing these characteristics with the displayed characteristics of the displayed text. An optimization algorithm may be used to make sure that every portion of the text is distinct from (i.e. has a sufficient difference from) the reflected background visual characteristics. The algorithm may search the space defined by the characteristics of the displayed text (font size, style, color, brightness, contrast, position) to determine where and how the displayed text is best positioned and displayed so that every part of the displayed text is distinct from the reflected background.

Referring back to FIG. 2, the apparatus 200 may optionally comprise an input/output interface 200 which is configured to enable a user to input commands to the apparatus 200 and/or configured to enable the apparatus to provide output to the user other than through the display 202. For example, the input/output interface 202 may be configured to detect gestures of the user 300 as input commands. In some examples, the apparatus 200 may be configured to detect a direction of gaze of the user 300 and this may be used to adapt the point of view 302.

Figure 9A:
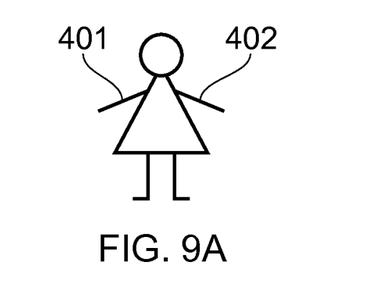
FIGS. 9A and 9B illustrate an example in which the apparatus is used to enable the user to provide input commands to the apparatus via a virtual user input window.
Figure 9B:
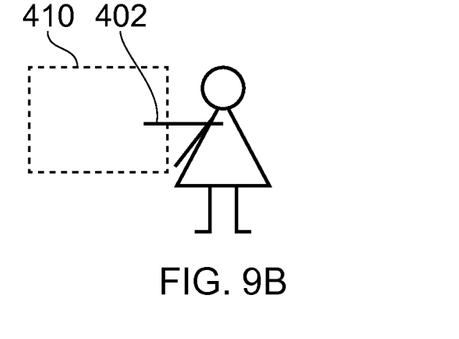

FIGS. 9A and 9B illustrate an example in which the apparatus 200 is used to enable the user 300 to provide input commands to the apparatus 200. In this example, the apparatus 200 is configured to use detector 210 to detect a first body part 401 to define a virtual user input window 410 and then to detect a second body part 402 to provide an input with respect to the virtual user input window 410.

For example, the first body part may be a user's face which may be tracked using face recognition algorithms (such algorithms are known in the field of computer vision and may, for example, use principal component analysis). The size of the user's face may determine the size of the virtual user input window 410. The movement of the second body part 402 may be interpreted as a cursor (pointer) control movement within the virtual user input window 410.

The first body part 401 is used to define the virtual user input window 410 but, in this example, does not provide an input at the virtual input user window 410. Also in this example, but not necessarily all examples, the second body part 402 is used to provide a user input at the virtual user input window but is not used to define the virtual user input window.

In this example, the first body part 410 is used to determine the size and position of the virtual user input window. The size of the first body part 410 determines the size of the virtual input window 410 and the position of the first body part 410 determines a position of the virtual input window. The position of the second body part 402 is continuously tracked after the virtual input window 410 has been defined to enable continuous user input via the virtual window 410.

In the preceding examples content 340 displayed in a display 202 has been controlled in dependence upon determination of a point of view 302 of a user 300. In some examples, the content 340 displayed may be used to provide a visual test to the user such as a visual acuity test. For example, a Snell chart may be displayed on all or part of the display 202.

In one example, the apparatus 200 may be configured to control the display 202 to highlight a particular letter in the Snell chart at a particular time. The apparatus 200 is then configured to detect user voice input at that time and determine if the detected voice input correctly identifies the highlighted letter. The apparatus 200 is then configured to record the result of the determination. The recorded results may then be used to assess the visual acuity of the user.

The apparatus 200 may measure the position of the user 300 during the visual acuity test.

In some examples, but not necessarily all examples, the apparatus 200 may issue audio commands or commands on the display 202 to position the user 300 at a correct position for administering the visual acuity test.

In other examples, the apparatus 200 may take account of the position of the user 300 relative to the display 202 and vary the size of the text on the display 202 so that it is rendered with the correct size for the distance of the user from the display 202 for the correct administration of the visual acuity test.

In other examples, the calculation that is used to determine the visual acuity of the user by the apparatus 200 may be altered to take account of the position of the user.

Implementation of the controller 201 may be as controller circuitry. The controller 201 may be implemented in hardware alone, have certain aspects in software including firmware alone or can be a combination of hardware and software (including firmware).

As illustrated in FIG. 2 the controller 201 may be implemented using instructions that enable hardware functionality, for example, by using executable instructions of a computer program 208 in a general-purpose or special-purpose processor 204 that may be stored on a computer readable storage medium (disk, memory etc) to be executed by such a processor 204.

The processor 204 is configured to read from and write to the memory 206. The processor 204 may also comprise an output interface via which data and/or commands are output by the processor 204 and an input interface via which data and/or commands are input to the processor 204.

The memory 206 stores a computer program 208 comprising computer program instructions (computer program code) that controls the operation of the apparatus 200 when loaded into the processor 204. The computer program instructions, of the computer program 208, provide the logic and routines that enables the apparatus to perform the methods illustrated in FIGS. 1, 4-6B, 7-8B, 9A & 9B. The processor 204 by reading the memory 206 is able to load and execute the computer program 208.

The apparatus 200 therefore comprises:
at least one processor 204; and
at least one memory 206 including computer program code
the at least one memory 206 and the computer program code configured to, with the at least one processor 204, cause the apparatus 200 at least to perform:
causing determining, relative to a display, a point of view of a user of the display;
causing controlling content displayed in the display in dependence upon the determination of the point of view of the user of the display.

The computer program 208 may arrive at the apparatus 200 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 208. The delivery mechanism may be a signal configured to reliably transfer the computer program 208. The apparatus 200 may propagate or transmit the computer program 208 as a computer data signal.

Although the memory 206 is illustrated as a single component/circuitry it may be implemented as one or more separate components/circuitry some or all of which may be integrated/removable and/or may provide permanent/semi-permanent/dynamic/cached storage.

Although the processor 204 is illustrated as a single component/circuitry it may be implemented as one or more separate components/circuitry some or all of which may be integrated/removable. The processor 204 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:

(a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the FIG. 1 may represent steps in a method and/or sections of code in the computer program 208. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The recording of data may comprise only temporary recording, or it may comprise permanent recording or it may comprise both temporary recording and permanent recording, Temporary recording implies the recording of data temporarily. This may, for example, occur during sensing or image capture, occur at a dynamic memory, occur at a buffer such as a circular buffer, a register, a cache or similar. Permanent recording implies that the data is in the form of an addressable data structure that is retrievable from an addressable memory space and can therefore be stored and retrieved until deleted or over-written, although long-term storage may or may not occur. The use of the term 'capture' in relation to an image relates to temporary recording of the data of the image. The use of the term 'store' in relation to an image relates to permanent recording of the data of the image.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

The examples above disclose a method comprising: determining, relative to a display, a point of view of a user of the display; controlling content displayed in the display in dependence upon the determination of the point of view of the user of the display.

In at least some examples, the method comprises controlling a position at which content is displayed in the display in dependence upon the determination of the point of view of the user of the display.

In at least some examples, the point of view of the user is determined by positioning the user relative to the display using a detector.

In at least some examples, the method comprises repeatedly determining a change in a point of view of the user relative to the display; and dynamically controlling a change in content displayed in the display immediately in dependence upon a change in a point of view of the user relative to the display.

In at least some examples, the method comprises using the point of view of the user to determine an area of the display where light from a scene feature leaves the display and reaches the user; and wherein controlling content displayed in the display in dependence upon said determination of the point of view of the user comprises controlling content displayed in the display area.

In at least some examples, the scene feature is a feature of a virtual space that is behind the display, wherein the display displays the scene feature and provides a virtual window to the virtual space.

In at least some examples, the method comprises scrolling content through a virtual fixed window when the user changes a point of view by controlling whether or not content is displayed on the display and where it is displayed in dependence upon said determination of the point of view of the user.

In at least some examples, the scene feature is a feature that is reflected, not displayed.

In at least some examples, the scene feature is a feature of a real space that is occupied by the user and viewed in reflection from a reflective surface of the display.

In at least some examples, the reflective surface of the display is a surface of a one-way-mirror.

In at least some examples, the method comprises detecting a position of one or more scene features.

In at least some examples, using the point of view of the user to determine an area of the display where light from the scene feature reaches the user comprises using the point of view of the user to determine an area of the display where light from the seen feature reflects to the user.

In at least some examples, the area of the display associated with the scene feature is avoided for displaying text on the display.

In at least some examples, the scene feature is selected because of its high brightness.

In at least some examples, the area of the display associated with the scene feature is used for displaying content on the display.

In at least some examples, the scene feature is selected because of a consistent appearance.

In at least some examples, the content displayed in the display in dependence upon said determination of the point of view of the user is displayed text.

In at least some examples, the displayed text is controlled in dependence upon said determination of the point of view of the user to change one or more of font size, font style, color, brightness, contrast.

In at least some examples, the displayed text is controlled in dependence upon said determination of the point of view of the user to optimize the displayed text to improve visibility of the text relative to a background determined by a reflected scene feature from the point of view of the user.

In at least some examples, the displayed text controlled in dependence upon the determination of the point of view of the user is controlled to vary one or more of size, position, color, brightness of the text to control differences between the text and the background to the text determined by reflected scene features from the point of view of the user.

In at least some examples, the method comprises avoiding having any portion of the displayed text greater in extent than a defined value, having a difference with respect to the background less than a threshold value.

In at least some examples, privacy of the user is protected.

In at least some examples, the method comprises detecting user input by gestures.

In at least some examples, the method comprises detecting a first body part of the user to define a virtual user input window; and detecting a second body part of the user to provide an input within the virtual user input window.

In at least some examples, the first body part is used to define the virtual user input window but not provide an input to the virtual user input window and the second body part is used to provide an input to the virtual user input window but not to define the virtual user input window.

In at least some examples, the first body part determines size and/or position of the virtual user input window.

In at least some examples, the detected size of the first body part determines a size of the virtual user input window.

In at least some examples, a position of the first body part determines the position of the virtual window.

In at least some examples, a position of the second body part is continuously tracked after the virtual user input window has been defined.

In at least some examples, the content displayed in the display in dependence upon the determination of the point of view of the user is a visual test for the user.

In at least some examples, the visual test is a visual acuity test.

In at least some examples, the visual acuity test is Snell chart.

In at least some examples, the method comprises highlighting a letter of the Snell chart, detecting user voice input, determining if detected voice input correctly identifies the highlighted letter, recording the result.

In at least some examples, the method comprises measuring a position of the user.

In at least some examples, the method comprises providing commands to the user to reposition the user and/or varying text size based on the position of the user and/or varying calculations of visual acuity based on the position of the user.

In at least some examples, an apparatus comprises means for performing the method of any preceding paragraph.

In at least some examples, a computer program when loaded into a processor enables the performance of the method of any preceding paragraph.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising: determining, relative to a display, a point of view of a user of the display; determining an area of the display where light from a scene feature reflects to the user based, at least partially, on the point of view of the user; and controlling content displayed in the determined area of the display in dependence upon the determination of the point of view of the user of the display.

2. The method as claimed in claim 1, comprising controlling a position at which other content is displayed in the display in dependence upon the determination of the point of view of the user of the display, wherein the determining of the point of view of the user comprises positioning the user relative to the display using a detector.

3. The method as claimed in claim 1, wherein the other content displayed in the display in dependence upon the determination of the point of view of the user is a visual test for the user, wherein the visual test is a visual acuity test, wherein the visual acuity test is Snell chart, the method comprising highlighting a letter of the Snell chart; detecting user voice input; determining whether the detected voice input correctly identifies the highlighted letter; recording a result of the determining; measuring a position of the user; and providing commands to the user to reposition the user and/or varying text size based on the position of the user and/or varying calculations of visual acuity based on the position of the user.

4. The method as claimed in claim 1, wherein the content comprises a virtual scene feature of a virtual space that is behind the display, wherein the display displays the virtual scene feature and provides a virtual fixed window to the virtual space and the method comprises scrolling the content through the virtual fixed window when the user changes a point of view, wherein the scrolling of the content comprises controlling whether the content is displayed on the display and where it is displayed, in dependence upon said determination of the point of view of the user.

5. The method as claimed in claim 1, wherein the scene feature comprises a feature of a real space that is occupied by the user and viewed in reflection from a reflective surface of the display.

6. The method as claimed in claim 5, wherein the reflective surface of the display is a surface of a one-way-mirror.

7. The method as claimed in claim 5, wherein the content displayed in the determined area of the display in dependence upon said determination of the point of view of the user is displayed text, wherein the displayed text is controlled in dependence upon said determination of the point of view of the user to optimize the displayed text to improve visibility of the text relative to a background determined based on the reflected scene feature from the point of view of the user.

8. The method as claimed in claim 5, wherein the content displayed in the determined area of the display in dependence upon said determination of the point of view of the user is displayed text and wherein the displayed text controlled in dependence upon the determination of the point of view of the user is controlled to vary one or more of size, position, color, or brightness of the text to control differences between the text and a background to the text determined based on the reflected scene feature from the point of view of the user.

9. The method as claimed in claim 1, comprising detecting a position of one or more scene features.

10. The method as claimed in claim 1, wherein the area of the display associated with the scene feature is avoided for displaying text on the display, wherein the scene feature is selected because of its high brightness.

11. The method as claimed in claim 1, wherein the scene feature is selected based on a consistent appearance.

12. The method as claimed in claim 1, further comprising detecting a first body part of the user to define a virtual user input window; and detecting a second body part of the user to provide an input within the virtual user input window, wherein the first body part is used to define the virtual user input window but not provide an input to the virtual user input window and the second body part is used to provide an input to the virtual user input window but not to define the virtual user input window, wherein the first body part determines size and/or position of the virtual user input window, wherein a detected size of the first body part determines the size of the virtual user input window, wherein a position of the first body part determines the position of the virtual window, wherein a position of the second body part is continuously tracked after the virtual user input window has been defined.

13. An apparatus comprising: at least one processor; and at least one non-transitory memory including computer program code; the at least one memory and the computer program code configured to, with the at least one processor, cause the apparatus at least to: cause determining, relative to a display, of a point of view of a user of the display; cause determining of an area of the display where light from a scene feature reflects to the user based, at least partially, on the point of view of the user; and cause controlling of content displayed in the determined area of the display in dependence upon the determination of the point of view of the user of the display.

14. The apparatus according to claim 13, further comprising a detector configured to detect a first body part to define a virtual user input window and configured to detect a second body part to provide an input with respect to the virtual user input window.

15. The apparatus according to claim 13, wherein the at least one memory and the computer program code are configured to, with the at least one processor, cause the apparatus to: cause controlling a position at which other content is displayed in the display in dependence upon the determination of the point of view of the user of the display.

16. The apparatus according to claim 13, wherein the content comprises a virtual scene feature of a virtual space that is behind the display, wherein the display displays the virtual scene feature and provides a virtual fixed window to the virtual space, wherein the at least one memory and the computer program code are configured to, with the at least one processor, cause the apparatus to: cause scrolling the content through the virtual fixed window when the user changes a point of view, wherein the scrolling of the content comprises controlling whether the content is displayed on the display and where it is displayed, in dependence upon said determination of the point of view of the user.

17. A non-transitory computer readable medium comprising program instructions for causing an apparatus to perform at least the following: cause determining, relative to a display, of a point of view of a user of the display; cause determining of an area of the display where light from a scene feature reflects to the user based, at least partially, on the point of view of the user; and cause controlling of content displayed in the determined area of the display in dependence upon the determination of the point of view of the user of the display.

18. The non-transitory computer readable medium according to claim 17, further comprising program instructions for causing the apparatus to further perform: cause controlling a position at which other content is displayed in the display in dependence upon the determination of the point of view of the user of the display.

19. The non-transitory computer readable medium according to claim 17, wherein the content comprises a virtual scene feature of a virtual space that is behind the display, wherein the display displays the virtual scene feature and provides a virtual fixed window to the virtual space, further comprising program instructions for causing the apparatus to further perform: cause scrolling the content through the virtual fixed window when the user changes a point of view, wherein the scrolling of the content comprises controlling whether the content is displayed on the display and where it is displayed, in dependence upon said determination of the point of view of the user.

\* \* \* \* \*